(12) United States Patent
Choi

(10) Patent No.: US 9,568,131 B2
(45) Date of Patent: Feb. 14, 2017

(54) CONNECTION STRUCTURE OF CORRUGATED PIPE

(75) Inventor: Jin Lim Choi, Sungnam-si (KR)

(73) Assignee: Dong-A Flexible Metal Tubes Co., Ltd., Seoul (KR)

( * ) Notice: Subject to any disclaimer, the term of this patent is extended or adjusted under 35 U.S.C. 154(b) by 178 days.

(21) Appl. No.: 13/639,389

(22) PCT Filed: Apr. 4, 2011

(86) PCT No.: PCT/KR2011/002333
§ 371 (c)(1),
(2), (4) Date: Nov. 6, 2012

(87) PCT Pub. No.: WO2011/126251
PCT Pub. Date: Oct. 13, 2011

(65) Prior Publication Data
US 2013/0049359 A1 Feb. 28, 2013

(30) Foreign Application Priority Data
Apr. 5, 2010 (KR) .................. 10-2010-0031019

(51) Int. Cl.
*F16L 25/00* (2006.01)
*F16L 19/04* (2006.01)

(52) U.S. Cl.
CPC .......... *F16L 25/0036* (2013.01); *F16L 19/041* (2013.01)

(58) Field of Classification Search
CPC .... F16L 25/0036; F16L 25/0054; F16L 19/05; F16L 19/028; F16L 19/0283; F16L 19/0286; F16L 19/04; F16L 19/041; F16L 19/043
USPC ................. 285/332–332.3, 334.1–334.5, 353–354, 285/382–382.7, 384–389, 903
See application file for complete search history.

(56) References Cited

U.S. PATENT DOCUMENTS

| 1,133,320 A | * | 3/1915 | Rockwood | 285/332.3 |
| 2,158,619 A | * | 5/1939 | Eastman | 285/334.5 |
| 2,158,620 A | * | 5/1939 | Eastman | 285/334.5 |
| 3,139,294 A | * | 6/1964 | Richards, Jr. | 285/332.3 |

(Continued)

FOREIGN PATENT DOCUMENTS

| JP | 10-185024 | 7/1998 |
| KR | 10-2005-0120245 A | 12/2005 |
| KR | 10-0764946 | 10/2007 |

OTHER PUBLICATIONS

International Search Report issued in PCT Application No. PCT/KR2011/002333 dated Oct. 25, 2011.

*Primary Examiner* — James Hewitt
(74) *Attorney, Agent, or Firm* — KED & Associates, LLP

(57) ABSTRACT

A connection structure of a corrugated pipe is provided that may include a corrugated pipe, a clamping nut located outside of the corrugated pipe, a confinement ring mounted on a valley of the corrugated pipe and disposed within the clamping nut, a connection body having an insertion portion inserted into the clamping nut and having male threads threaded to the clamping nut, and a packing member located between an end of the corrugated pipe and the insertion portion to compress and deform the end of the corrugated pipe when the clamping nut is clamped and to provide a sealing between the end of the corrugated pipe and the insertion portion. As the packing member provides the sealing between the insertion portion of the connection body and the end of the corrugated pipe, a gap may minimally occur and reliability is increased.

9 Claims, 5 Drawing Sheets

(56) References Cited

U.S. PATENT DOCUMENTS

| | | | | |
|---|---|---|---|---|
| 5,076,313 | A * | 12/1991 | Bottum et al. | 137/74 |
| 7,900,971 | B2 * | 3/2011 | Chiu | 285/207 |
| 2008/0036207 | A1 * | 2/2008 | Choi | 285/323 |

* cited by examiner

CONNECTION STRUCTURE OF CORRUGATED PIPE

CROSS-REFERENCE TO RELATED PATENT APPLICATIONS

This application is a U.S. National Stage Application under 35 U.S.C. §371 of PCT Application No. PCT/KR2011/002333, filed Apr. 4, 2011, which claims priority to Korean Patent Application No. 10-2010-0031019, filed Apr. 5, 2010.

TECHNICAL FIELD

The present invention relates to a connection structure of a corrugated pipe, and particularly to a connection structure that connects a corrugated pipe to a connection body, such as a socket pipe.

BACKGROUND ART

In general, a corrugated pipe includes alternating mountains and valleys and may be bent by an external force. Such corrugated pipes may be used for coolant piping in an air conditioner.

A corrugated pipe may be connected to a connection body through a clamping nut. When the corrugated pipe is clamped to the clamping nut, an end of the corrugated pipe is compressed and deformed by the connection body so that sealing may be done between the corrugated pipe and the connection body.

PRIOR DOCUMENT

Patent Document (Patent Document 1) Korean Patent Application Publication No. 10-2005-0120245 (Dec. 22, 2005)

DISCLOSURE OF INVENTION

Technical Problem

The conventional connection structure of a corrugated pipe has problems in that in the case that the corrugated pipe is formed of a material with high hardness, an end of the corrugated pipe may not be sufficiently compressed and deformed and there may be a gap between the end and the connection body.

Solution To Problem

According to an embodiment of the present invention, there is provided a connection structure of a corrugated pipe comprising a corrugated pipe, a clamping nut located outside the corrugated pipe, a confinement ring mounted on a valley of the corrugated pipe and held in position of the clamping nut, a connection body having an insertion portion inserted into the clamping nut and having male threads threaded to the clamping nut, and a packing member located between an end of the corrugated pipe and the insertion portion to compress and deform the end of the corrugated pipe when the clamping nut is clamped and to provide sealing between the end of the corrugated pipe and the insertion portion.

The packing member comprises an outer circumferential portion surrounding a portion of an outer surface of the insertion portion, a contact portion bent at the outer circumferential portion and contacting the end of the corrugated pipe and the insertion portion, and an inner circumferential portion bent at the contact portion and inserted into the insertion portion.

The packing member comprises an inclined portion brought in surface contact with the end of the corrugated pipe.

The insertion portion comprises an inclined portion brought in surface contact with the inclined portion of the packing member to be opposite to the inclined portion of the packing member.

The confinement ring includes a rounded inner portion.

The rounded portion has a semi-circular cross section.

The packing member is formed of a metal material different from a material of the corrugated pipe.

The corrugated pipe is formed of steel and the packing member is formed of copper.

A hardness of the packing member is 0.166 to 0.177 times of a hardness of the corrugated pipe.

A hardness of the corrugated pipe is lower than a hardness of the confinement ring and the clamping nut and higher than a hardness of the packing member.

An example of the connection body is a service valve provided in an air conditioner.

Another example of the connection body is a socket pipe.

Advantageous Effects of Invention

In the connection structure of the corrugated pipe according to the present invention as configured above, the packing member provides sealing between the insertion portion of the connection body and the end of the corrugated pipe. Thus, a gap may minimally occur and reliability may be increased.

Further, work may be done while the packing member is inserted into the connection body, thus convenience in work may be increased.

Still further, since the inclined portion is provided at each of the insertion portion of the connection body and the packing member, and the packing member is inserted into the end of the corrugated pipe like a wedge to compress the end of the corrugated pipe, the end of the corrugated pipe may be more strongly compressed, thus further increasing reliability.

Still further, since the rounded portion of the confinement ring is brought in line contact with the end of the corrugated pipe to provide a concentrated compression force, high sealing effects and secure connection may be achieved.

Still further, the packing member is partially pressurized when the end of the corrugated pipe is compressed and deformed, and this maximizes sealing between the end of the corrugated pipe and the packing member.

BEST MODE FOR CARRYING OUT THE INVENTION

Hereinafter, embodiments of the present invention will be described with reference to the accompanying drawings.

Figure 1:
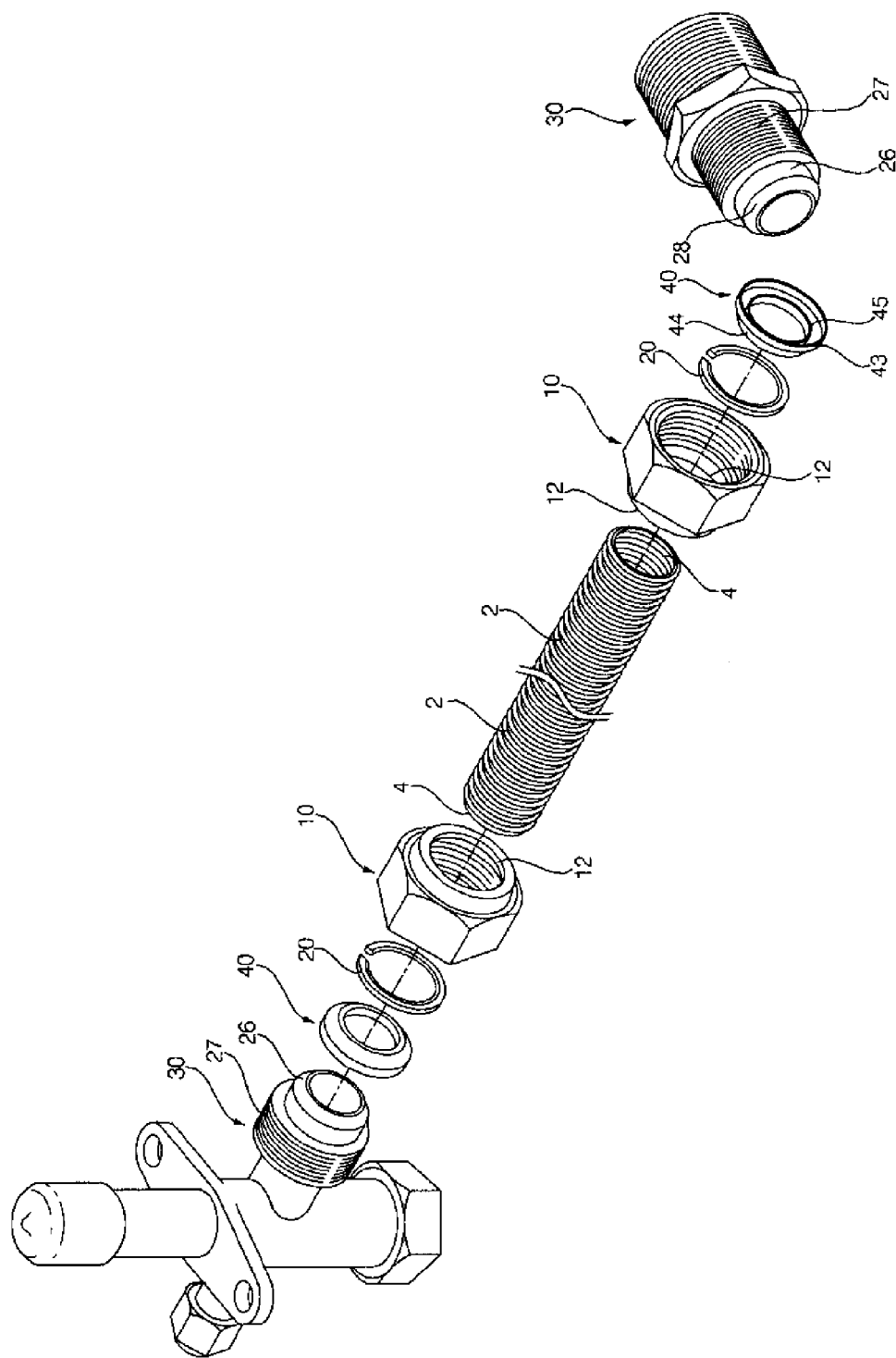
FIG. 1 is an exploded perspective view illustrating a connection structure of a corrugated pipe according to an embodiment of the present invention.
Figure 2:
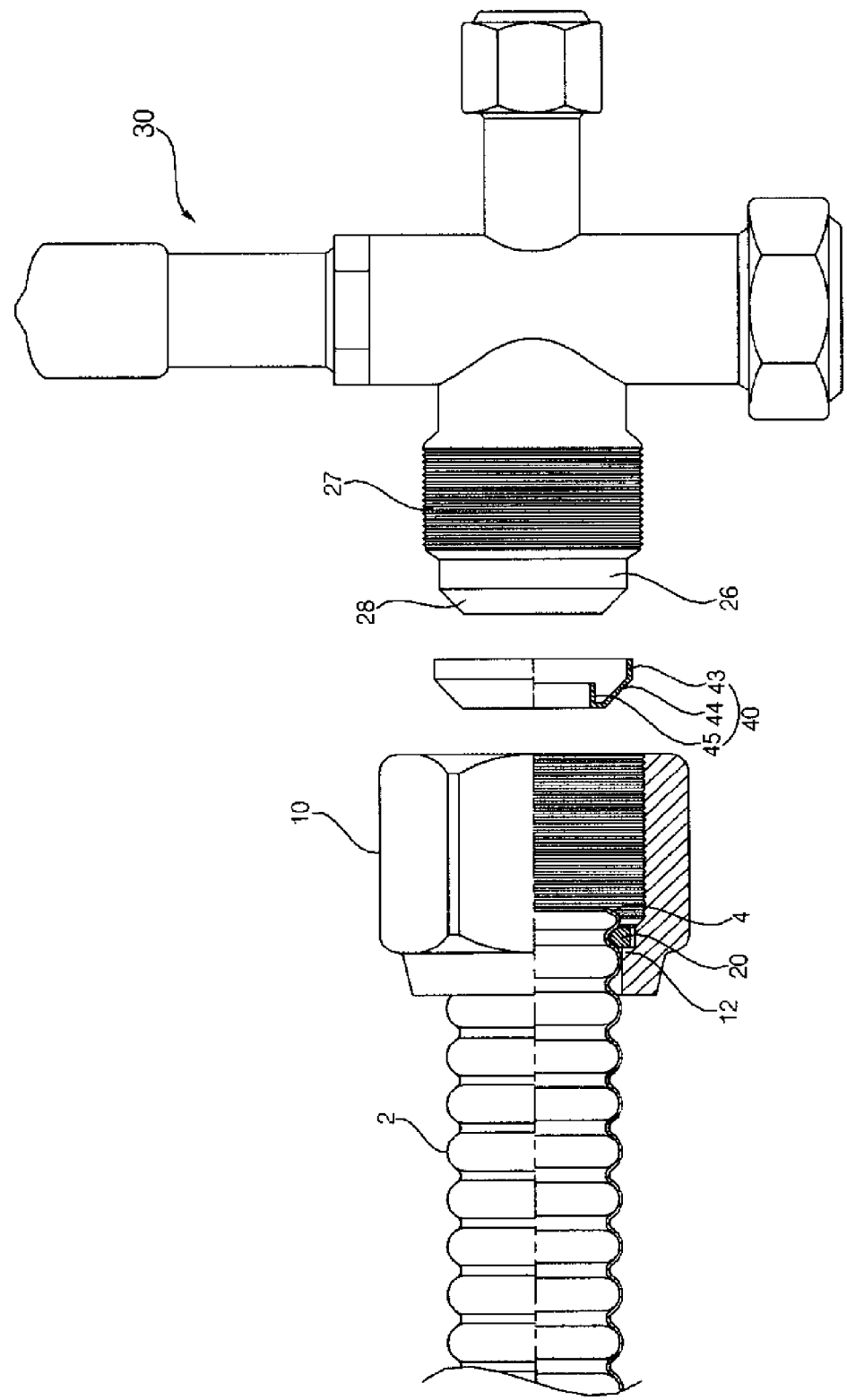
FIG. 2 is a cross-sectional view illustrating the corrugated pipe and the connection body shown in FIG. 1 before connection.
Figure 3:
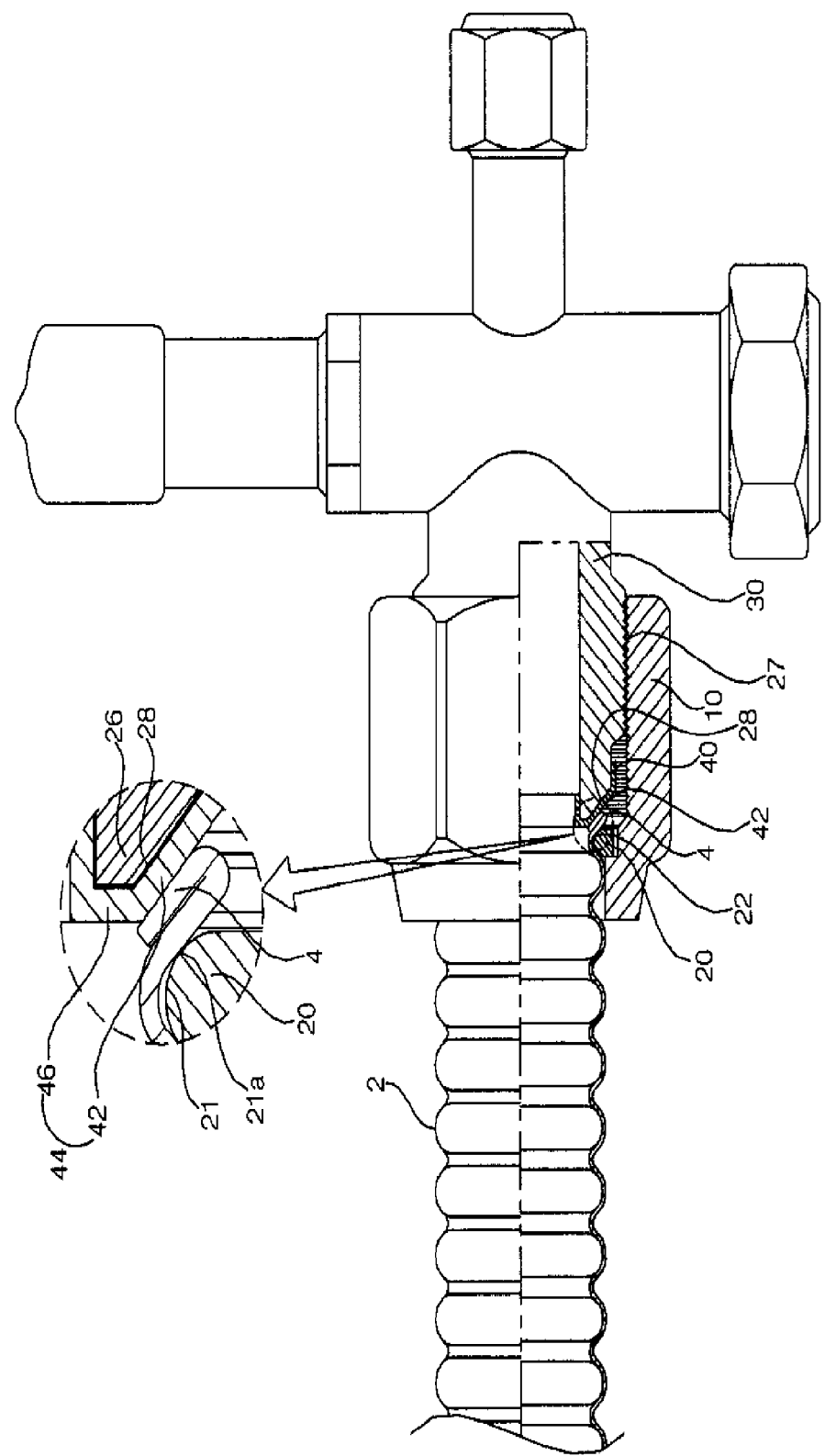
FIG. 3 is a cross-sectional view illustrating the corrugated pipe and the connection body shown in FIG. 1 after connection.
Figure 4:
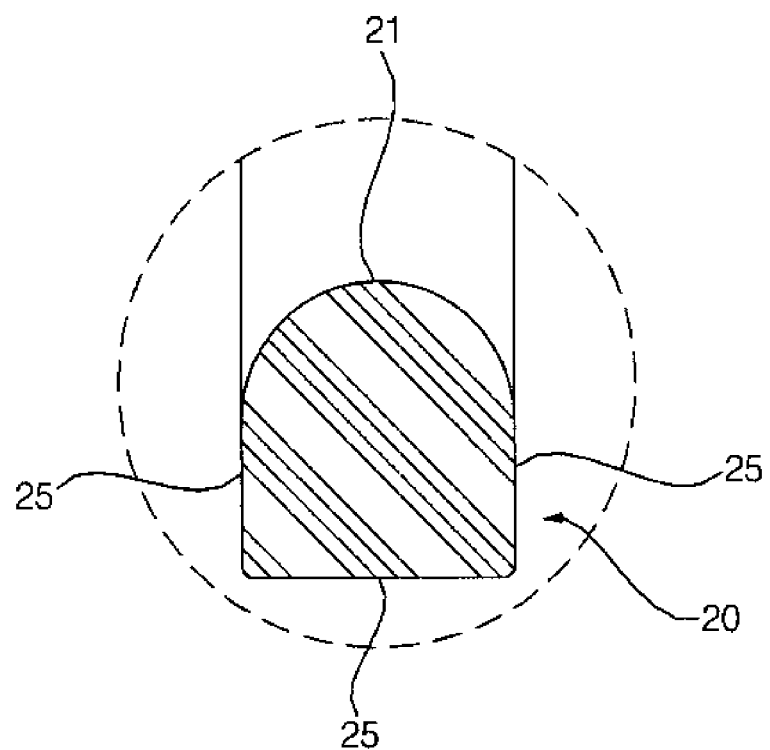
FIG. 4 is an expanded cross-sectional view illustrating the confinement ring shown in FIG. 3.
Figure 5:
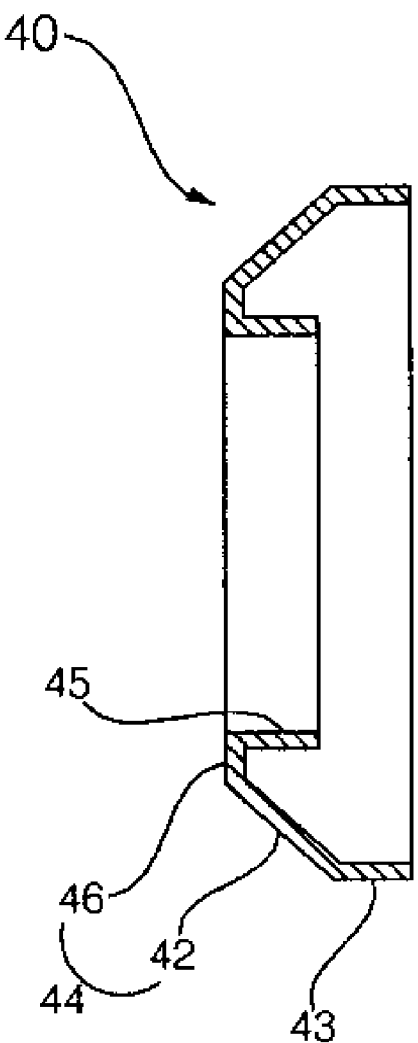
FIG. 5 is an expanded cross-sectional view illustrating the packing member shown in FIG. 3.

FIG. 1 is an exploded perspective view illustrating a connection structure of a corrugated pipe according to an embodiment of the present invention, FIG. 2 is a cross-sectional view illustrating the corrugated pipe and the connection body shown in FIG. 1 before connection, FIG. 3 is a cross-sectional view illustrating the corrugated pipe and the connection body shown in FIG. 1 after connection, FIG. 4 is an expanded cross-sectional view illustrating the confinement ring shown in FIG. 3, and FIG. 5 is an expanded cross-sectional view illustrating the packing member shown in FIG. 3.

Referring to FIGS. 1 to 5, a connection structure of a corrugated pipe according to an embodiment includes a corrugated pipe 2, clamping nuts 10, confinement rings 20, connection bodies 30 and 30', and packing members 40. The clamping nuts 10 are located outside the corrugated pipe 2. The confinement rings 20 are mounted on valleys of the corrugated pipe 2 and held in position of the clamping nuts 10. Each of the connection bodies 30 and 30' includes an insertion portion 26 inserted into the clamping nut 10. Each of the connection bodies 30 and 30' has external threads threaded to the clamping nut 10. The packing members 40 are located between ends 4 of the corrugated pipe 2 and the insertion portions 26 to compress and deform the ends 4 of the corrugated pipe 2 while providing sealing between the ends 4 of the corrugated pipe 2 and the insertion portions 26 when the clamping nuts 10 are clamped.

Each of the clamping nuts 10 includes a protruded stopper 12 by which the confinement ring 20 is held in position and has internal threads on an inner circumferential surface so that the internal threads of the clamping nut 10 are threaded to the external threads 27.

The confinement ring 20 restricts movement of the clamping nut 10 upon connection of the corrugated pipe 2 and is shaped as "C". While mounted on the valleys of the corrugated pipe 2, the confinement ring 20 is deformed by an external force. When completely mounted on the valleys of the corrugated pipe 2, the confinement ring 20 is elastically restored and positioned in the corrugated pipe 2.

The confinement ring 20 has a rounded inner portion 21 and flat front, rear, and outer portions 25.

The rounded inner portion 21 of the confinement ring 20 has a cross section of a semi-circular shape. When the corrugated pipe 2 is connected to the connection bodies 30 and 30', each of the ends 4 of the corrugated pipe 2 is brought in line contact with the round inner portion 21 of the confinement ring 20, thus leading to a concentrated compression force. Thus, sealing effects are increased to ensure a secure connection between the corrugated pipe 2 and the connection bodies 30 and 30'.

The insertion portion 26 includes an inclined portion 28 that is brought in surface contact with an inclined portion 42 of the packing member 40 so that the inclined portions 28 and 42 face each other.

The connection bodies 30 and 30' may include a service valve 30 and a socket pipe 30' provided in an air conditioner. An end of the corrugated pipe 2 may be connected to the service valve 30, and the other end of the corrugated pipe 2 may be connected to the socket pipe 30'.

The service valve 30 and the socket pipe 30' have the same configuration in the insertion portion 26 and external threads 27. For convenience of description, an example where the corrugated pipe 2 is connected to the service valve 30 will be described in detail.

The packing member 40 includes an outer circumferential portion 43 surrounding part of an outer surface of the insertion portion 26, a contact portion 44 bent from the outer circumferential portion 43 and contacting the end 4 of the corrugated pipe 2 and the insertion portion 26, and an inner circumferential portion 45 bent from the contact portion 44 and inserted into the insertion portion 26.

The packing member 40 includes the inclined portion 42 brought in surface contact with the end 4 of the corrugated pipe 2.

The contact portion 44 includes an inclined portion 42 that is inclinedly bent from the outer circumferential portion 43 and brought in surface contact with the inclined portion 28 of the insertion portion 26 and a vertical connection portion 46 that is located between the inclined portion 42 and the inner circumferential portion 45 to connect them.

Upon connection between the corrugated pipe 2 and the connection bodies 30 and 30', an inner surface of the inclined portion 42 is brought in surface contact with the insertion portion 26 and an outer surface of the inclined portion 42 is brought in contact with the end 4 of the corrugated pipe 2.

The packing member 40 and the corrugated pipe 2 are formed of different metals.

The corrugated pipe 2 is formed of stainless steel, and the packing member 40 is formed of copper.

A hardness of the corrugated pipe 2 is lower than a hardness of the confinement ring 20 and the clamping nut 10, and higher than a hardness of the packing member 40.

If a hardness of the corrugated pipe 2 is higher than a hardness of the confinement ring 20 and the clamping nut 10, the confinement ring 20 and the clamping nut 10 may be deformed by the corrugated pipe 2. Accordingly, a hardness of the corrugated pipe 2 is formed to be lower than a hardness of the confinement ring 20 and the clamping nut 10. A hardness of the packing member 40 is formed to be lower than a hardness of the corrugated pipe 2 so that the packing member 40 is partially pressurized by the corrugated pipe 2.

A hardness of the packing member 40 may be preferably set to be 0.166 to 0.177 times of a hardness of the corrugated pipe 2.

Hereinafter, an operation of a connection structure of a corrugated pipe configured above will be described.

First, part of the corrugated pipe 2 is inserted into the clamping nut 10 so that the clamping nut 10 is positioned outside the part of the corrugated pipe 2. Then, the confinement ring 20 is engaged into a valley next to an outmost mountain of the end 4 of the corrugated pipe 2. Thereafter, the clamping nut 10 is moved in a direction of the clamping nut 10 surrounding the end 4 of the corrugated pipe 2. Then, the stopper 12 is stopped by the confinement ring 20 so that the clamping nut 10 stops moving.

If the inner circumferential portion 45 of the packing member 40 is inserted into the insertion portion 26, the outer circumferential portion 43 of the packing member 40 surrounds an outer surface of the insertion portion 26, the inner circumferential portion 45 is surrounded by the insertion portion 26, and the inclined portion 42 of the contact portion 44 is brought in surface contact with the inclined portion 28 of the insertion portion 26. That is, the packing member 40 is engaged to the insertion portion 26 while surrounding the overall insertion portion 26 of the connection body 30.

When the clamping nut 10 is rotated while inserting into the clamping nut 10 the male threads 27 and the insertion portion 26 of the connection portion 30 engaged with the packing member 40, the male threads 27 are gradually connected to the clamping nut 10. At this time, the packing member 40 is brought in contact with the end 4 of the corrugated pipe 2 to doubly compress and deform the end 4 of the corrugated pipe 2 and is thereby pressurized by the end 4 of the corrugated pipe 2.

The outermost mountain in the end 4 of the corrugated pipe 2 is bent to have the same angle as that of the inclined portion 42 of the packing member 40 and brought in line contact with a predetermined area 21a of the rounded portion 21 of the confinement ring 20 and is thereby strongly compressed.

In the connection structure of a corrugated pipe according to the embodiments, the insertion portion 26 of the connection body 30 or 30' is compressed by the packing member 40, and the end 4 of the corrugated pipe 2 is compressed by the packing member 40, and the confinement ring 20 is brought in line contact with the end 4 of the corrugated pipe 2. Thus, the area 21a subjected to line contact is strongly compressed, thus increasing sealing effects.

On the other hand, upon connection of the corrugated pipe 2, as the end 4 of the corrugated pipe 2 is compressed, the packing member 40 is pressurized by the end 4 of the corrugated pipe 2 since the packing member 40 has a lower hardness than that of the corrugated pipe 2, and a gap between the end 4 of the corrugated pipe 2 and the packing member 40 and a gap between the insertion portion 26 of the connection body 30 and the packing member 40 are minimized.

The invention claimed is:

1. A connection structure of a corrugated pipe, the connection structure comprising
    a corrugated pipe;
    a clamping nut located outside of the corrugated pipe;
    a confinement ring mounted in a valley of the corrugated pipe and disposed within the clamping nut;
    a connection body having an insertion portion inserted into the clamping nut and having male threads threaded to the clamping nut; and
    a packing member located between an end of the corrugated pipe and the insertion portion to compress and deform the end of the corrugated pipe when the clamping nut is clamped and to provide a sealing between the end of the corrugated pipe and the insertion portion,
    wherein the packing member comprises an inclined portion that comes into surface contact with the end of the corrugated pipe, wherein the confinement ring consists of a rounded inner portion and a flat outer portion, wherein the rounded inner portion has a semicircular cross section and faces the inclined portion of the packing member, and the flat outer portion extends vertically outward from an end of the rounded inner portion, wherein the pounded inner portion of the confinement ring comes into line contact with the end of the corrugated pipe and the flat outer portion of the confinement ring does not come into contact with the end of the corrugated pipe, thus concentrating a compression force on a position of the end of the corrugated pipe which comes into the line contact with the rounded inner portion of the confinement ring.

2. The connection structure of a corrugated pipe of claim 1, wherein the packing member comprises an outer circumferential portion that surrounds a portion of an outer surface of the insertion portion, a contact portion that includes the inclined portion bent at the outer circumferential portion and that contacts the end of the corrugated pipe and the insertion portion, and an inner circumferential portion bent at the contact portion and inserted into the insert on portion.

3. The connection structure of corrugated pipe of claim 1, wherein the insertion portion comprises an inclined portion brought into surface contact with the inclined portion of the packing member to be opposite to the inclined portion of the packing member.

4. The connection structure of a corrugated pipe of claim 1, wherein the packing member is formed of a metal material different from a material of the corrugated pipe.

5. The connection structure of a corrugated pipe of claim 1, wherein the corrugated pipe is formed of steel and the packing member is formed of copper.

6. The connection structure of a corrugated pipe of claim 1, wherein a hardness of the packing member is 0.166 to 0.177 times a hardness of the corrugated pipe.

7. The connection structure of a corrugated pipe of claim 1, wherein a hardness of the corrugated pipe is lower than a hardness of the confinement ring and the clamping nut and higher than a hardness of the packing member.

8. The connection structure of a corrugated pipe of claim 1, wherein the connection body is a service valve provided in an air conditioner.

9. The connection structure of a corrugated pipe of claim 1, wherein the connection body is a socket pipe.

* * * * *